United States Patent
Drmota et al.

(10) Patent No.: US 8,887,378 B2
(45) Date of Patent: Nov. 18, 2014

(54) METHOD FOR PRODUCING A FLAT COMMUTATOR, AND FLAT COMMUTATOR

(75) Inventors: Marjam Drmota, Idrija (SI); Damjan Kumer, Gorenja vas (SI); Silvester Jesenko, Godovic (SI)

(73) Assignee: Kolektor Group D.O.O., Idrija (SI)

( * ) Notice: Subject to any disclaimer, the term of this patent is extended or adjusted under 35 U.S.C. 154(b) by 39 days.

(21) Appl. No.: 13/486,322

(22) Filed: Jun. 1, 2012

(65) Prior Publication Data

US 2012/0242188 A1 Sep. 27, 2012

Related U.S. Application Data

(63) Continuation of application No. PCT/EP2010/007318, filed on Dec. 2, 2010.

(30) Foreign Application Priority Data

Dec. 4, 2009 (DE) .......................... 10 2009 057 063

(51) Int. Cl.
| | |
|---|---|
| *H01R 39/32* | (2006.01) |
| *H01R 43/08* | (2006.01) |
| *H01R 39/06* | (2006.01) |
| *H01R 39/04* | (2006.01) |
| *H02K 13/00* | (2006.01) |

(52) U.S. Cl.
CPC ................ *H01R 39/32* (2013.01); *H01R 43/08* (2013.01); *H02K 13/006* (2013.01); *H01R 39/06* (2013.01); *H01R 39/045* (2013.01)
USPC ........................................... 29/597; 310/237

(58) Field of Classification Search
CPC ........ H01R 39/06; H01R 43/06; H01R 43/08; H01R 39/32; H02K 13/006; H02K 13/04
USPC ...................................... 310/237; 29/596, 597
See application file for complete search history.

(56) References Cited

U.S. PATENT DOCUMENTS

| 5,442,849 | A | * | 8/1995 | Strobl | ............................ | 29/597 |
| 5,637,944 | A | * | 6/1997 | Shimoyama | .................. | 310/237 |

(Continued)

FOREIGN PATENT DOCUMENTS

| DE | 102005028789 | 12/2006 |
| DE | 102006021696 | 11/2007 |

(Continued)

OTHER PUBLICATIONS

Machine Translation of Description and Claims of DE9100539.*

(Continued)

*Primary Examiner* — Burton Mullins
*Assistant Examiner* — Mark R Carter
(74) *Attorney, Agent, or Firm* — Myers Wolin, LLC

(57) ABSTRACT

A flat commutator having a support body, carbon segments, and conductor segments. The support body is formed on a carbon ring disk, which is later separated into carbon segments that are insulated from one another, the support body sitting against the carbon ring disk radially outward, radially inward, and against the end face of the carbon ring disk, the end face lying opposite the brush contact surface. The conductor segments are subsequently applied individually such that a contact pin of each segment penetrates a cavity that extends from the support body surface lying opposite the brush contact surface to the surface of the segments or of the carbon ring disks, the surface lying opposite the brush contact surface; and the free end of the contact pin contacts the surface of the segments or of the carbon ring disk, the surface lying opposite the brush contact surface.

27 Claims, 10 Drawing Sheets

(56) References Cited

U.S. PATENT DOCUMENTS

| | | | | |
|---|---|---|---|---|
| 5,677,588 A | * | 10/1997 | Strobl | 310/237 |
| 5,760,518 A | * | 6/1998 | Abe et al. | 310/237 |
| 5,898,989 A | * | 5/1999 | Strobl | 29/597 |
| 6,584,673 B2 | * | 7/2003 | Schmidt | 29/597 |
| 6,667,565 B2 | * | 12/2003 | Strobl | 310/237 |
| 6,684,485 B1 | * | 2/2004 | Potocnik et al. | 29/597 |
| 6,844,654 B2 | * | 1/2005 | Potocnik | 310/236 |
| 7,057,325 B2 | * | 6/2006 | Friebe | 310/237 |
| 2001/0024074 A1 | * | 9/2001 | Kiyose et al. | 310/237 |
| 2004/0100160 A1 | * | 5/2004 | Potocnik | 310/236 |
| 2004/0232798 A1 | * | 11/2004 | Kobayashi et al. | 310/233 |
| 2005/0046301 A1 | * | 3/2005 | Friebe | 310/237 |
| 2009/0091209 A1 | * | 4/2009 | Kumar et al. | 310/234 |

FOREIGN PATENT DOCUMENTS

| | | |
|---|---|---|
| EP | 0667657 | 8/1995 |
| EP | 1524736 | 4/2006 |
| JP | 08065967 | 3/1996 |
| JP | 11055904 | 2/1999 |
| JP | 2000208225 | 7/2000 |
| WO | 92/01321 | 1/1992 |

OTHER PUBLICATIONS

Machine Translation of Description and Claims of DE102005028789.*
Machine Translation of Description and Claims of DE102006021696.*
Machine Translation of JP2000-208225.*
Machine Translation of JPH08-065967.*
Machine Translation of JPH11-055904.*
Machine Translation of WO92/01321 (PCT/DE91/00539).*
International Search Report (with English translation) for corresponding International Application No. PCT/EP2010/007318 mailed on Mar. 7, 2011.

\* cited by examiner

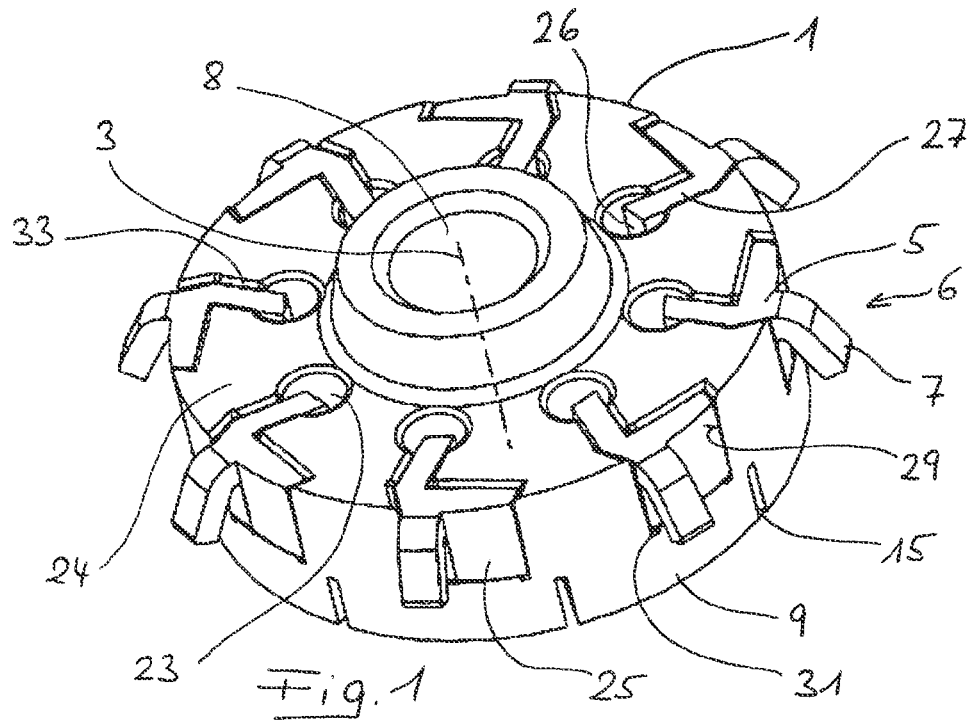
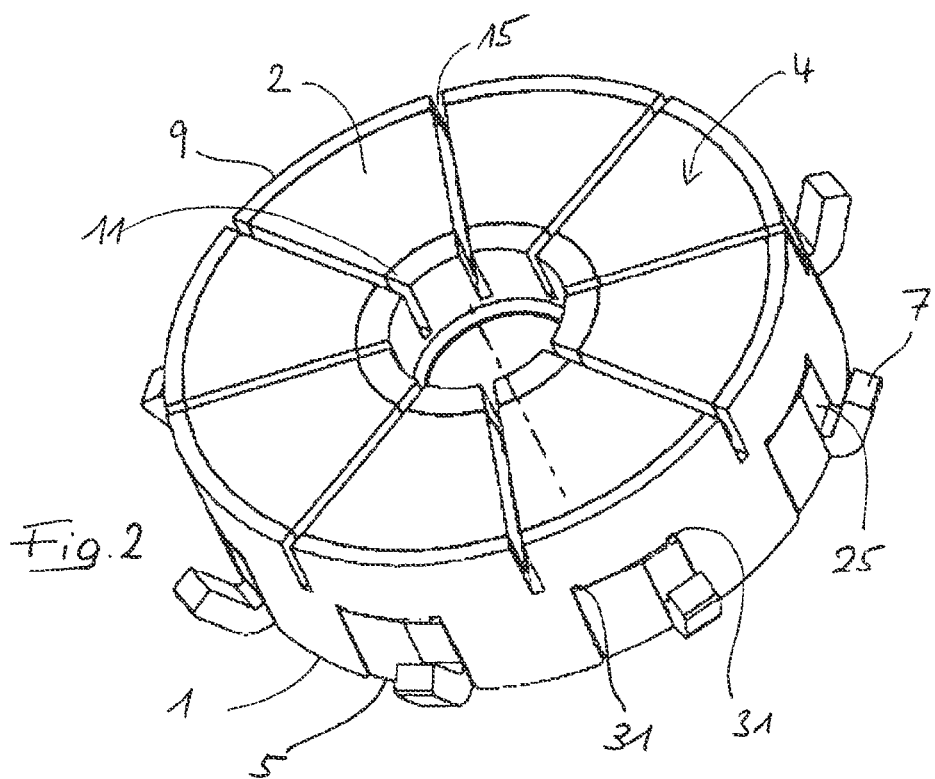

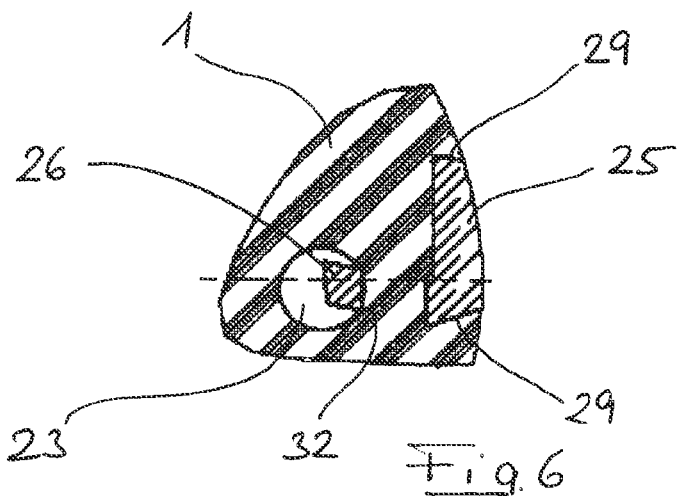
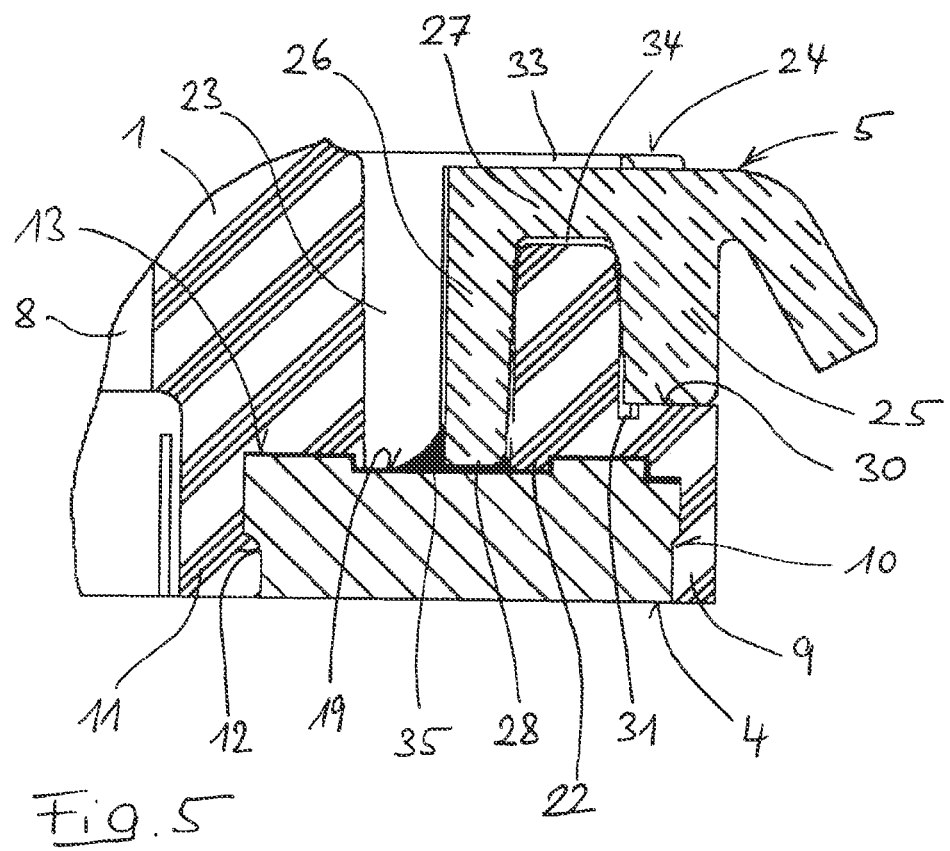

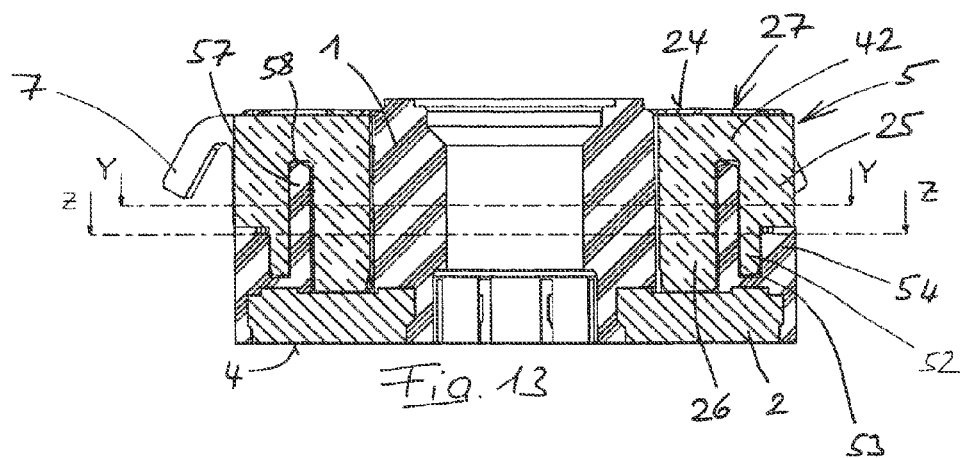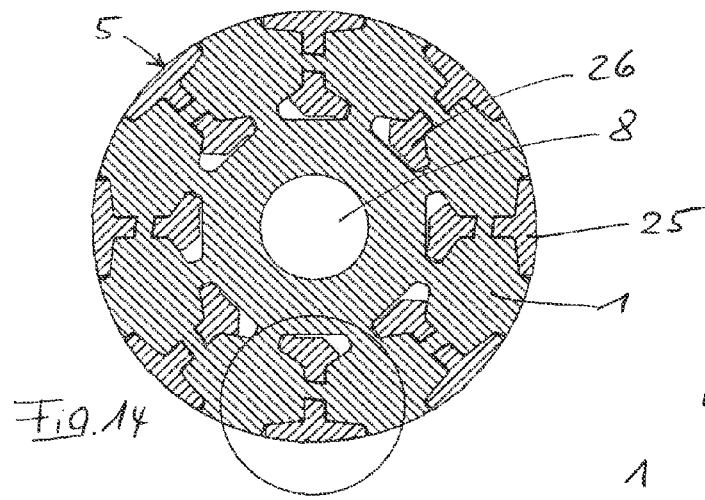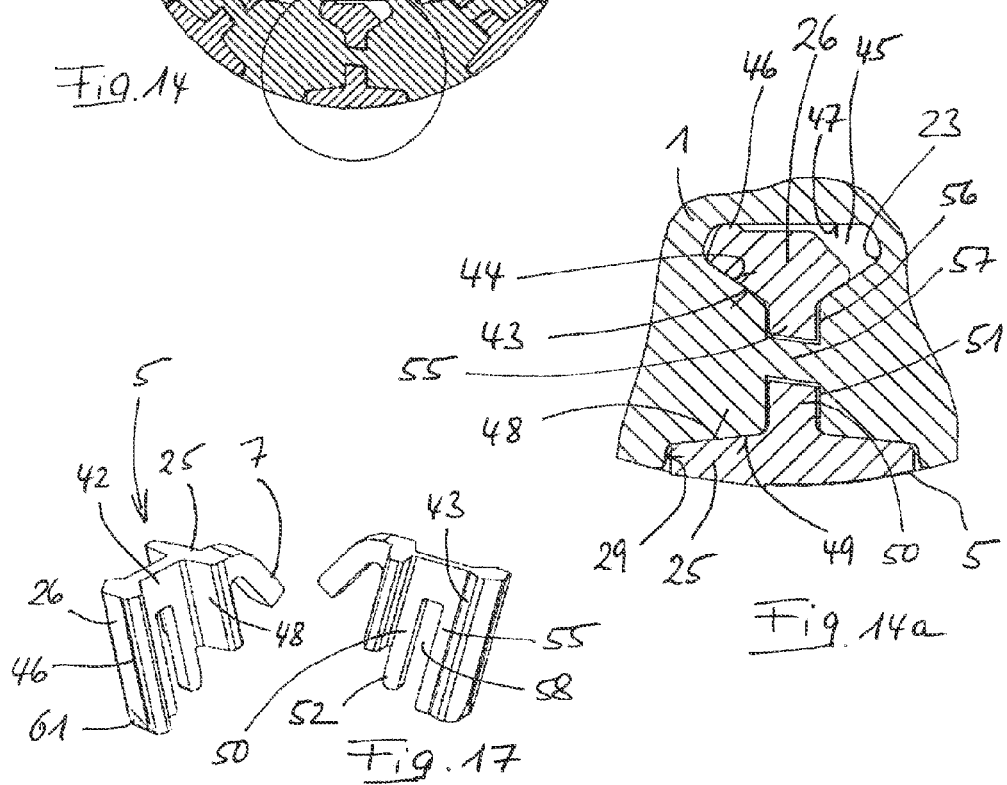

METHOD FOR PRODUCING A FLAT COMMUTATOR, AND FLAT COMMUTATOR

CROSS REFERENCE TO RELATED APPLICATIONS

The present application is a continuation of International Application No. PCT/EP2010/007318 filed Dec. 2, 2010, which claims priority to German Patent Application No. 10 2009 057 063.2 filed on Dec. 4, 2009, the contents of each of which are incorporated herein by reference.

FIELD OF THE INVENTION

The present invention relates to a method for producing a flat commutator for a dynamoelectric machine, which commutator comprises an insulating support body, a plurality of carbon segments and a plurality of conductor segments connected electrically conductively therewith, wherein the carbon segments define a substantially plane brush running surface and the conductor segments each have a rotor-winding terminal. Furthermore, the present invention relates to a flat commutator produced by such a method, comprising an insulating support body, a plurality of carbon segments insulated from one another and a plurality of conductor segments connected electrically conductively therewith, wherein the carbon segments define a substantially plane brush running surface, the conductor segments respectively have a rotor-winding terminal and the support body bears interlockingly and frictionally thereon in radially outward and radially inward position as well as on the end face of the carbon segments opposite the brush running surface.

BACKGROUND

Flat commutators with carbon running surface are known in diverse embodiments. In this regard, especially U.S. Pat. No. 5,760,518 A, WO 92/01321 A1, JP 2000208225 A, U.S. Pat. No. 5,637,944 A, EP 667657 A1, U.S. Pat. No. 5,442,849 A, JP 08065967 A, U.S. Pat. No. 6,667,565 B2, EP 1524736 B1, DE 102005028789 A1, JP 11055904 A and DE 102006021696 A1 belong to the pertinent prior art. These known flat commutators with carbon running surface and the methods used for producing them can be subdivided substantially into five groups as follows.

According to a first group of embodiments, a uniform metal part (conductor blank) is overmolded with the plastic that forms the support body. Then the conductor blank is machined down with a lathe on its end face and a annular carbon disk is adhesively bonded or soldered onto the conductor blank, or in other words onto its end face. Then the annular carbon disk is sawed into segments, wherein the conductor blank is also separated into the individual conductor segments insulated from one another. In this production method and the flat commutators produced according thereto, especially the lack of mechanical anchoring of the carbon segments in the support body is a disadvantage, which results in an unsatisfactory—at least for several applications—useful life of the commutator in question. Furthermore, protection of the metal surfaces exposed in the region of the saw cuts is necessary, the production method is laborious and expensive and the consumption of metal material for the conductor segments is very high, which in view of the raw material prices, which have risen considerably in just the most recent times, especially for copper, makes the corresponding flat commutators considerably more expensive.

According to a second group of production methods, an integral metal body, which forms the conductor blank and which in particular may comprise conductor segments joined to one another by means of bridging parts, is soldered or adhesively bonded to a premachined annular carbon disk, so that the two parts form an electrically conductive assembly. Thereafter this assembly is overmolded with plastic in order to form the support body. This is followed by the mechanical machining of the projecting parts (bridging parts) of the metal body and of the terminal hooks for the rotor winding, the surface protection of the metal faces (tinning), the mechanical machining of the frontal carbon surface, the sawing of the annular carbon disk into carbon segments, the bending of the hooks and the machining of the bore. As regards the first group of production methods (see hereinabove), the consumption of metal material is lower here; however, the number of machining operations is similarly high. Nevertheless, the anchoring of the carbon segments in the support body is improved.

In the third group of production methods (see, for example, DE 102005028789 A1), the integral base body is first injection-molded from plastic or is formed in some other way; and then individual metal segments, which already have a finished shape of the hooks and are already surface-protected, are inserted into the support body. Then the inserted conductor segments are joined together with the uniformly premachined annular carbon disk by addition of electrically conductive binder. Then the end face of the annular carbon disk is machined by turning and the disk is sawed to carbon segments and the bore is machined. In this procedure the number of machining operations can indeed be reduced compared with the two groups mentioned first and second; and also the relatively low consumption of metals for production of the conductor segments is advantageous. However, the flat commutators produced in this way are again not adequately reliable, because the carbon segments are poorly anchored.

In the fourth group of production methods, pulverized graphite material is pressed into shape around the conductor blank in order to form the carbon segments (see, for example, JP 08065967 A). Heretofore such a method has proved unsuitable in practice for production of reliable, long-lasting flat commutators with carbon running surface.

In the fifth group of production methods (see, for example, JP 2000208225 and DE 102006021 696 A1) and corresponding flat commutators, typically no metal conductor segments whatsoever are used. In this case, a uniform annular carbon disk is typically overmolded with the plastic of the support body. Then the annular carbon disk is subdivided by saw cuts into the insulated carbon segments. Since it is not possible in such embodiments to wind the rotor winding in the usual manner around the hooks typically disposed on the conductor segments or to weld the hooks, the methods established in this respect for joining the rotor winding to the commutator cannot be employed. Instead, other solutions must be sought, such as using a separate insulating insert, which provides for contacting the ends of the rotor winding directly with the carbon segments, if necessary by using an electrically conductive binder.

Finally, a special approach is taken in JP 11055904 A, according to which individual prefabricated carbon segments are inserted into a support consisting of ceramic and comprising a bottom and a rim, wherein a core likewise consisting of ceramic is inserted in radially inside position between the carbon segments. In this case metal terminal hooks project with an end portion between respectively the radially outside face of a carbon segment and the radially inside face of the support rim. By means of plastic compound, a support body that overlaps the rim of the ceramic support in radially outside position and the ceramic core in radially inside position is then molded onto the unit prefabricated in such a way and comprising ceramic support, ceramic core, carbon segments and terminal hooks. As in many of the methods explained in the foregoing for producing flat commutators provided with a brush running surface formed by carbon segments, the inadequate anchoring of the carbon segments here also does not satisfy the practical requirements and detracts from the useful life.

SUMMARY

In view of the prior art explained in the foregoing, the object of the present invention is to provide a method as indicated in the introduction for producing a flat commutator, which method is characterized by simple and reliable process management as well as by a small demand for expensive starting material, wherein the flat commutator produced in such a way is intended to be characterized in particular by low production costs as well as high reliability and long useful life.

This object is achieved according to the present invention by a method for producing a flat commutator for a dynamo-electric machine, which commutator comprises an insulating support body, a plurality of carbon segments and a plurality of conductor segments connected electrically conductively therewith, wherein the carbon segments define a substantially plane brush running surface and the conductor segments each have a rotor-winding terminal, which method comprises the following steps: preparation of an annular carbon disk; molding of the support body onto the annular carbon disk in such a way that the support body bears interlockingly and frictionally thereon in radially outward position and radially inward position as well as on the end face of the annular carbon disk opposite the brush running surface;

creation, in the support body, of openings that extend from the surface of the support body opposite the brush running surface to the surface of the carbon segments or of the annular carbon disk opposite the brush running surface;

mounting of the conductor segments on the support body in such a way that a contact pin of the conductor segments passes respectively through one of the openings and at its free end contacts the surface of the carbon segments or of the annular carbon disk opposite the brush running surface;

separation of the annular carbon disk into carbon segments insulated from one another.

According to a further aspect of the present invention, the object mentioned hereinabove is achieved by a flat commutator produced according to the method specified in the foregoing, which commutator comprises an insulating support body, a plurality of carbon segments insulated from one another and a plurality of conductor segments connected electrically conductively therewith, wherein the carbon segments define a substantially plane brush running surface, the conductor segments respectively have a rotor-winding terminal and the support body bears interlockingly and frictionally thereon in radially outward and radially inward position as well as on the end face of the carbon segments opposite the brush running surface and is provided with openings that extend from the surface of the support body opposite the brush running surface to the surface of the carbon segments opposite the brush running surface, wherein furthermore a contact pin of the conductor segments passes respectively through one of the openings and at its free end contacts the surface of the carbon segments opposite the brush running surface.

The following steps or viewpoints functionally related to one another are characteristic in combination with one another for the inventive method for producing a flat commutator comprising an insulating support body, a plurality of carbon segments and a plurality of conductor segments connected electrically conductively therewith. The starting point of the carbon segments is an annular carbon disk, which can be produced with relatively little complexity in very good quality and homogeneity. Onto this annular carbon disk there is formed—by injection molding of plastic material—the support body, specifically in such a way that it bears interlockingly and frictionally thereon in radially outward and radially inward position as well as on the end face of the annular carbon disk opposite the brush running surface. In the support body there are created openings, which extend from the surface of the support body opposite the brush running surface to the surface of the annular carbon disk opposite the brush running surface or, if the annular carbon disk has already been separated at that time into carbon segments (see hereinafter), to the individual carbon segments. These said openings, which correspond in number to the number of (subsequent) carbon segments as well as conductor segments, may already be formed in the shape of the support body, especially if cavities corresponding to the openings are formed in the support body by corresponding cores of the mold die. Such a procedure is particularly advantageous with regard to inexpensive production of the inventive flat commutator. However, it is not mandatory. To the contrary, the said openings may also be created later in the support body (for example, by boring). In such a case, conductor segments—individual and separate from the very beginning—are mounted on the support body, specifically in such a way that a contact pin of the respective conductor segments is respectively inserted (from the end face of the support body opposite the brush running surface) into one of the said openings of the support body and is passed therethrough such that, and at its free end, preferably with its end face, it contacts the corresponding associated carbon segment or the annular carbon disk, specifically preferably the surface of the corresponding associated carbon segment or of the annular carbon disk opposite the brush running surface.

According to a first preferred improvement of the inventive method for producing a flat commutator, the separation of the annular carbon disk into insulated individual carbon segments already takes place before the conductor segments are mounted on the support body. It is likewise advantageous when the creation of the openings in the support body already takes place during molding of the support body, for example by formation of corresponding cavities by cores inserted in the injection-molding die (see hereinabove). However, neither option is mandatory.

Furthermore, it is advantageous according to another preferred improvement of the invention when a contacting substance is introduced into the openings, and especially preferably, in fact, before the conductor segments are mounted on the support body. For this purpose especially a soldering substance and an electrically conductive adhesive can be considered as suitable contacting substance, wherein, if solder is used as the contacting substance, the annular carbon disk is expediently metallized completely or at least partly on its surface opposite the brush running surface, while an electrically conductive adhesive has proved expedient for an annular carbon disk that cannot be soldered.

Another preferred improvement of the invention is characterized in that the intermediate product comprising the annular carbon disk and the support body is subjected before mounting of the conductor segments to technical aging, especially thermal aging. Alternatively or cumulatively, the intermediate product comprising the annular carbon disk or the already separated carbon segments, the support body, the conductor segments and if applicable a contacting substance can be heat-treated, in order to ensure durable, stable electrical connections between the carbon and the conductor segments. Both method variants have a favorable effect on the useful life and the long-term reliability of the flat commutator produced according to the inventive method.

Likewise with regard to high reliability of the flat commutator, it is particularly advantageous when the annular carbon disk is profiled in steps and/or is toothed in the region of its outer and/or of its inner circumferential rim. Profiling such that the support body and the carbon segments engage with one another via undercuts is then particularly favorable. Especially when the contact pins contact the end face of the carbon segments opposite the brush running surface with their own end faces, the said end face is preferably provided with an annular slot. All of these measures lead to improved interlocking toothing of the annular carbon disk with the support body molded onto it, with the result of improved fixation of the carbon segments therein in axial direction and in circumferential direction or in radial direction.

Particularly reliable and long-lasting contacting of the contact pins with the carbon segments can be achieved when the annular carbon disk is provided on its end face opposite the brush running surface with socket-like projections, into which the contact pins of the conductor segments mounted on the support body penetrate with their free ends. For this purpose the contact pins are provided in particular with tapered contact tips. This is advantageous especially when the openings, according to a further preferred improvement of the invention, are filled, after the conductor segments have been mounted on the support body, at least partly with a protective and/or sealing substance (such as a plastic resin), which shields the contact zones between the carbon segments and the respective associated contact pins reliably from the medium in which the commutator in question will be operated.

Further particularly preferred improvements of the invention relate to the configuration of the conductor segments and their functional interaction with the support body. Besides the contact pins, the conductor segments are preferably provided with a base and a bridging part, which joins the contact pins with the base, wherein a substantially U-shaped geometry is established in the axial section due to the arrangement of base, bridging part and contact pins. These bridging parts are preferably received in recesses that extend in the support body, on its end face opposite the brush running surface, respectively to an associated opening.

This base of each conductor segment is preferably received in an associated pocket of the support body, wherein the base of the conductor segments and the respective associated pocket engage in one another, particularly preferably in interlocking relationship. It is particularly advantageous when the bridging parts respectively have the form of a flat, especially radially oriented connecting web, which is narrower in circumferential direction than the base and the contact pin. For good retention of the conductor segments, it is then further favorable when on both sides of the connecting web the base and the contact pin bear with bearing faces on corresponding bracing faces of the associated pocket or receiving area of the support body. For a good flow of force within the conductor segment, self-centering of the conductor segments and simple mounting of the conductor segments is further advantageous in this case when the said bracing and bearing faces corresponding to one another converge in pairs in the form of wedges in the direction of the connecting web.

Another particularly preferred improvement is characterized in that a tongue projecting in axial direction toward the brush running surface opposite the base is molded in the radially inside position onto the base, wherein the corresponding axial extension formed by the tongue engages in an associated opening of the support body in such a way that it is overlapped in the radially outward position by the support body. In this way the respective conductor segment is fixed securely in radial direction even at high speeds of the rotor equipped with the commutator and correspondingly high centrifugal forces at its base. Especially at its end portion opposite the axial extension, this said tongue can merge into the bridging part made as the connecting web and in this respect contribute to stiffening.

Another preferred option for fixing the conductor segments reliably in the support body in the respective region of their base consists in an undercut configuration of the interlocking joint between the base and the associated receiving area, for example via a dovetailed type of cross-sectional profiling.

According to yet another preferred improvement of the invention, a tongue that engages in a corresponding opening of the support body is molded in radially outward position onto the contact pin. Particularly preferably, this tongue extends substantially over the entire axial height of the contact pin, so that it can merge into the bridging part forming the connecting web and in this respect can contribute to stiffening of the conductor segment.

By stiffening the conductor segment by means of the tongues at the base of or on the contact pin as mentioned several times in the foregoing, the bridging part can have a relatively small cross section. This suppresses excessive heat flow from the base to the contact pin, so that a soldered joint of the contact pins with the carbon segments does not suffer any damage even if the rotor winding is welded to the terminal hooks.

The pockets mentioned hereinabove and receiving the base of the conductor segments are preferably provided in the region of their bottom with an incision having a tangential portion disposed in radially inward position and two radial portions. This permits exact positioning of the conductor segments in the associated pockets even when the respective base is seated very tightly in the pocket and some material may be scraped off from the support body during insertion of the base in the pocket, since this material finds space in the incision and does not hinder insertion of the base as far as the predetermined stop. The rotor winding terminal (such as a hook) is preferably disposed on the base of the conductor segments explained in the foregoing, and specifically is particularly preferably disposed off-centered relative thereto. This is favorable for optimum connection of the rotor winding with the respective associated rotor winding terminal by bending of the hooks and welding, without damaging the connection of the contact pins with the carbon segments. In this respect, it is also favorable from viewpoints of heat distribution during welding of the rotor winding when the cross-sectional area of the base is larger in a plane perpendicular to the commutator axis than the cross-sectional area of the contact pin.

The bridging parts already explained in detail in the foregoing may also be resiliently compliant to a certain extent in axial direction and may run substantially in a plan perpendicular to the commutator axis. In addition, the bridging parts may be received with clearance in the recesses of the support body that extend on its end face opposite the brush running surface respectively to an associated opening. The foregoing measures favor tolerance compensation, in turn favoring reliable contact of the end faces of the contact pins with the carbon segments. Furthermore, the bridging parts may have an orientation differing from the radial alignment. This is also advantageous for tolerance compensation between support body and conductor segment, in this way favoring good retention of the conductor segments in the support body.

Various further supplementary features likewise act favorably on the useful life of the flat commutator according to the present invention. As an example, they include the following features, which are applicable individually or in combination with one another: The contact pins of the conductor segment respectively fill the cross sections of the associated openings only partly, especially only to at most 60%, particularly preferably only to at most 40%; this is favorable for non-forcible mounting of the conductor segments, makes it possible to check the connection of the contact pins with the carbon segments visually and favors filling of the openings with a protective and/or sealing substance after the conductor segments have been mounted (see hereinabove). For precise but non-forcible positioning of the contact pins in the associated openings of the support body, it is then particularly favorable when each contact pin is provided in radially inward position with a tongue extending substantially in axial direction and bearing on the opposite surface of the opening receiving the contact pin, or else, in an alternative configuration, the surface of the opening receiving the contact pin is provided in radially inward position with a tongue extending substantially in axial direction, on which tongue the contact pin bears with its opposite surface.

As an alternative to the geometry of the contact pins already explained hereinabove, these may also have a polygonal cross section and bear along edges on the inner surface of the respective associated opening; this may favor mechanical jamming of the conductor segments on the support body in the individual case. Nevertheless, as explained, such a polygonal cross section of the contact pins is in no way mandatory; to the contrary, good results can also be achieved with round or rounded cross-sectional shapes of the contact pins.

BRIEF DESCRIPTION OF THE DRAWINGS

In the following, preferred exemplary embodiments of the present invention will be illustrated on the basis of the drawings explained hereinafter, wherein FIG. 1 shows a perspective view from above of a flat commutator produced by application of the present invention, FIG. 2 shows a perspective view from below of the flat commutator according to FIG. 1, FIG. 5 shows a detail of FIG. 4 in an enlarged view, FIG. 6 shows a section, normal to the commutator axis, through the flat commutator according to FIGS. 1 to 5 along line VI-VI of FIG. 4 in an enlarged diagram

FIG. 13 shows an axial section through the flat commutator according to FIGS. 11 and 12 along line X-X in FIG. 12, FIG. 14 shows a section, normal to the commutator axis, through the flat commutator according to FIGS. 11 to 13 along line Y-Y of FIG. 13, FIG. 14a shows a detail of FIG. 14 in an enlarged view.

FIG. 17 shows the conductor segment of the flat commutator according to FIGS. 11 to 15 from two different viewing directions.

DETAILED DESCRIPTION

Figure 3:
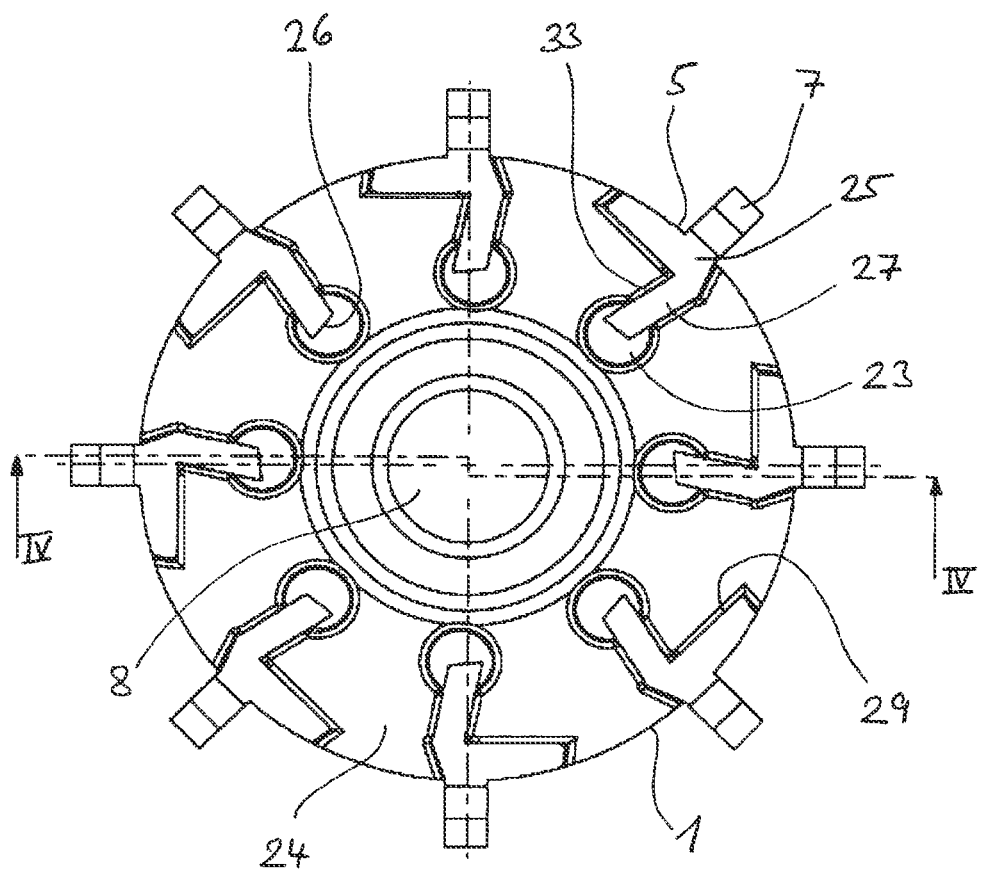
FIG. 3 shows a top view of the flat commutator according to FIGS. 1 and 2.
Figure 4:
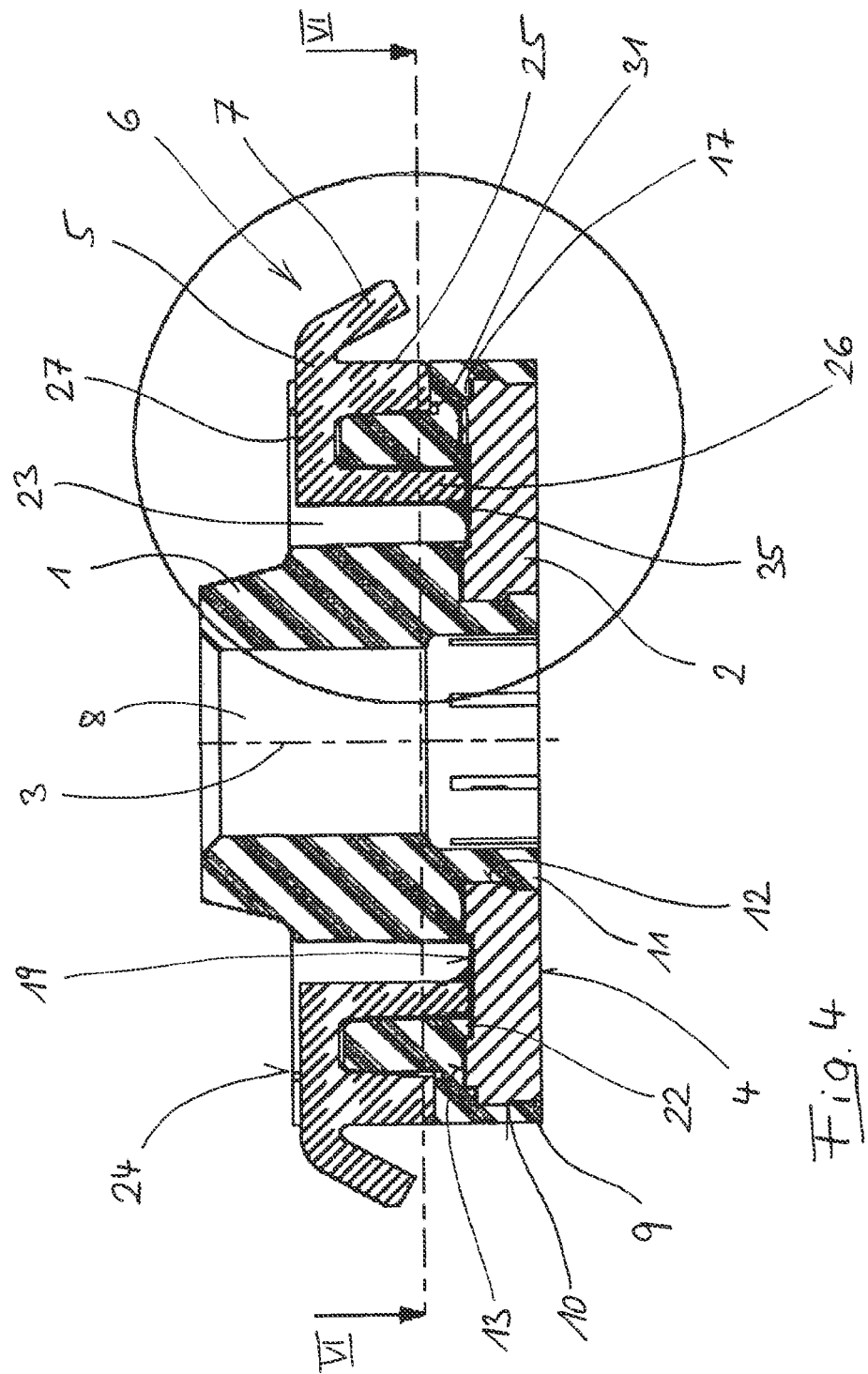
FIG. 4 shows an axial section through the flat commutator according to FIGS. 1 to 3 along line IV-IV in FIG. 3.

The flat commutator illustrated in the drawing comprises an insulating support body 1, eight carbon segments 2, which are insulated from one another and define a substantially plane brush running surface 4 disposed perpendicular to commutator axis 3, and eight conductor segments 5 connected electrically conductively to carbon segments 2. Each of the conductor segments 5 is provided with a rotor winding terminal 6 in the form of a hook 7.

Support body 1, which in known manner has a central bore 8 for mounting the flat commutator on the rotor shaft of a dynamoelectric machine, bears interlockingly and frictionally with an outer collar 9 on the radially outer circumferential face 10 and with an inner collar 11 on the radially inner circumferential face 12 of carbon segments 2. Furthermore, support body 1 also bears interlockingly and frictionally on end face 13 of carbon segments 2 opposite brush running surface 4. This is achieved by injection molding support body 1 onto annular carbon disk 14 (FIG. 7), from which carbon segments 2 are obtained by later subdivision (separation) by means of radial saw cuts 15. The specific profiling of annular carbon disk 14, namely the profiling of a step in annular carbon disk 14 in the region of its outer circumferential face 10 as well as of its inner circumferential face 12, wherein the step is an enlargement of the radial extent of the annular carbon disk in the direction away from brush running surface 4, results on the basis of the corresponding undercut of support body 1 in reliable axial fixation of carbon segments 2 in support body 1. Reliable tangential fixation of carbon segments 2 in support body 1 is achieved by a toothed form of outer circumferential surface 10 as well as of inner circumferential face 12 of annular carbon disk 14 or of carbon segments 2 extending therefrom by the fact that corresponding projections of support body 1 molded onto annular carbon disk 14 engage in openings 17 or 18 of annular carbon disk 14, which openings form toothings 16. An annular slot 20, which extends in circumferential direction on surface 19 of annular carbon disk 14 opposite brush running surface 4 and in which the support body injection-molded onto annular carbon disk 14 engages with a corresponding annular projection 22, favors radial fixation of carbon segments 2 in support body 1.

Support body 1 is provided with eight substantially cylindrical openings 23, which are parallel to one another and to commutator axis 3 and which extend from surface 24 of support body 1 opposite brush running surface 4 to surface 19 of carbon segments 2 opposite brush running surface 4. By virtue of openings 23, surface 19 of carbon segments 2 is exposed and is available for contacting with conductor segments 5.

Each conductor segment 5 comprises, as main portions, a base 25, a contact pin 26 and a bridging part 27 joining contact pin 26 with base 25. Contact pins 26 of conductor segments 5 pass respectively through associated opening 23 and with their end face 28 contact surface 19 of carbon segments 2 opposite brush running surface 4. Base 25 of each conductor segment 5 is respectively received in a corresponding pocket 29 of support body 1, wherein base 25 and respective associated pocket 29 engage interlockingly in one another via dovetail-type cross-sectional profiling (see FIG. 6). At their bottom 30, pockets 29 are provided with an incision 31 extending radially inward as well as radially toward the outside face of the support body.

Contact pins 26 are not seated tightly in associated openings 23; instead they fill the cross sections of respective openings 23 only partly, specifically to less than 50% (see FIG. 6). Above and beyond this, they have a cross-sectional shape deviating from the cross-sectional shape of openings 23, since whereas openings 23 have a round cross section the cross section of contact pins 26 is polygonal. As a consequence, contact pins 26 bear along edges 32 on the inner surface of respective associated opening 23. The cross-sectional area of contact pins 26 in a plane perpendicular to commutator axis 3 is considerably smaller than the cross-sectional area of the respective associated base 25 of conductor segment 5.

Hook 7 is molded onto base 25, and specifically is off-centered. Likewise, bridging part 27 is joined in off-centered relationship to base 25. Bridging parts 27 run substantially in a plane perpendicular to commutator axis 3, and specifically with an orientation slightly deviating from radial alignment. They are received in recesses 33, which respectively extend on end face 24 of support body 1 opposite the brush running surface from a pocket 29 to an associated opening 23. Bridging parts are resiliently compliant and in addition have some clearance 34 in the respective associated recess 33, so that tolerance compensation favoring reliable contact of the end faces of contact pins 26 with carbon segments 2 is achieved.

By means of openings 23, an electrically conductive adhesive 35, which provides for lasting reliable contact of contact pins 26 with carbon segments 2, is applied on the surface of carbon segments 2.

The production of the flat commutator according to FIGS. 1 to 7 is already apparent substantially from the foregoing explanations of the present invention. In this respect it merely seems worth mentioning that not only may openings 23 be formed in support body 1 as early as during injection-molding thereof, but instead that later production of the openings (for example by boring) is also possible. Furthermore, saw cuts 15, which serve for separating annular carbon disk 14 into individual carbon segments 2 insulated from one another, may be created already before or else after conductor segments 5 have been mounted on support body 1.

Figure 7:
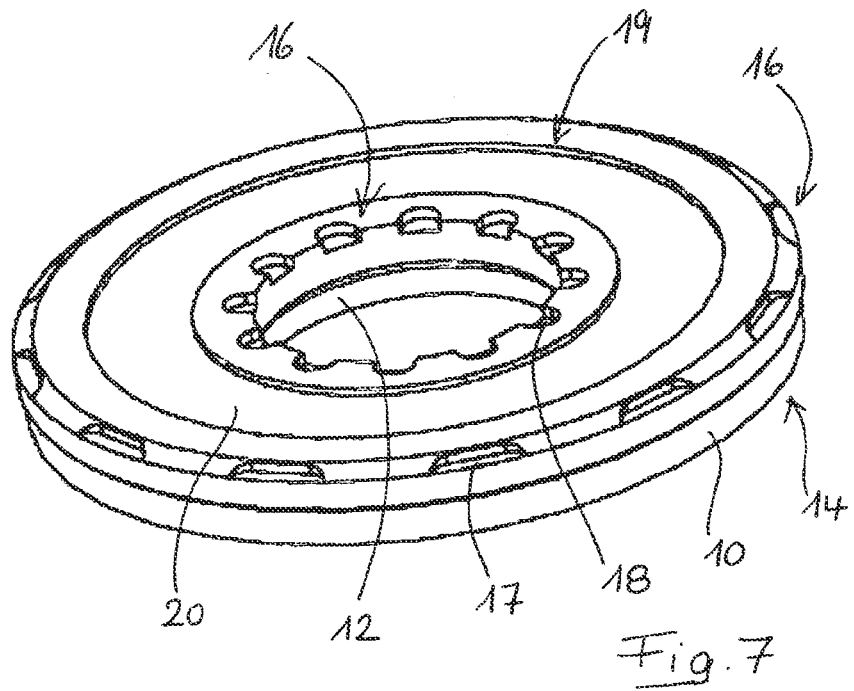
FIG. 7 shows a perspective view of the annular carbon disk used for producing the flat commutator according to FIGS. 1 to 6. Furthermore
Figure 8:
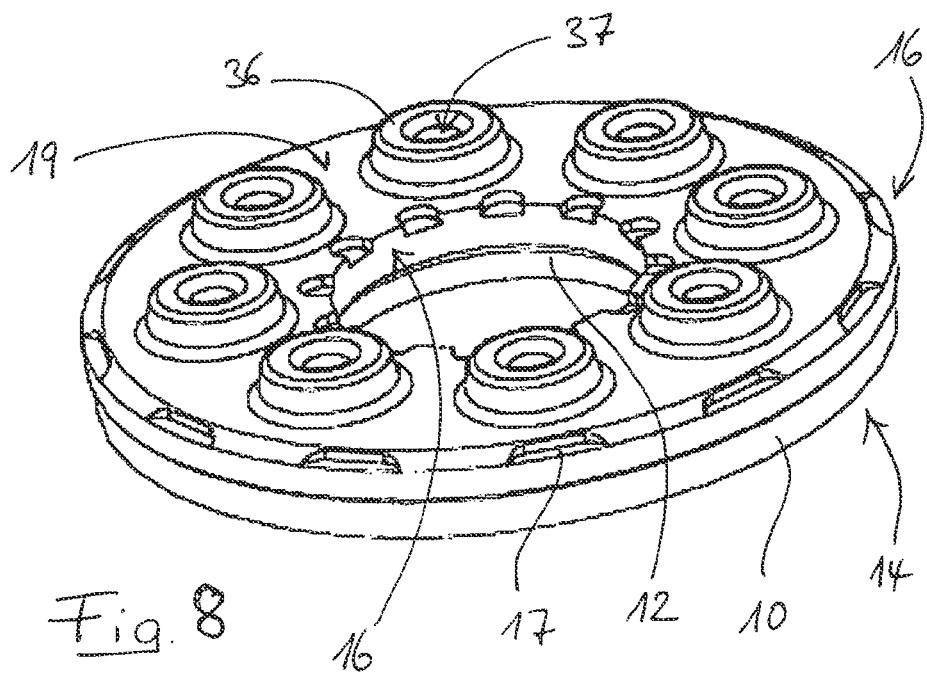
FIG. 8 shows a perspective view of the annular carbon disk used for producing the further exemplary embodiments of inventive flat commutators illustrated in FIGS. 9 and 10.

Annular carbon disk 14 illustrated in FIG. 8, in contrast to annular carbon disk 14 according to FIG. 7, is provided on its surface 19 opposite brush running surface 4 not with an annular slot but instead with eight socket-like projections 36. These respectively form a receiving cavity 37 for the end portions of contact pins 26 of conductor segments 5, which portions engage therein and are shaped as tapered contact tips 38 (see FIGS. 9 and 10). These receiving cavities 37 are dimensioned such that contact pins 26 penetrate slightly therein with permanent deformation of the carbon material in the region of their edge 39 bounding end face 28, so that permanent, reliable, annular contact zones 40 are formed.

Figure 9:
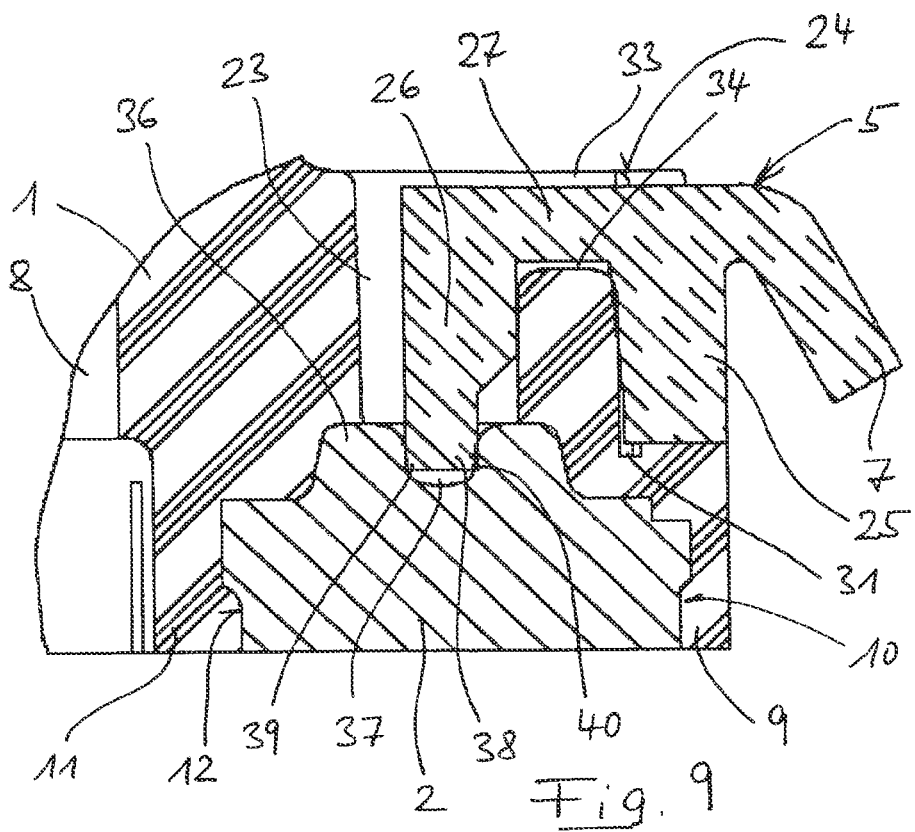
FIG. 9 shows a partial axial section through a second exemplary embodiment of a flat commutator according to the present invention and FIG. 10 shows a partial axial section through a third exemplary embodiment of a flat commutator according to the present invention. And finally
Figure 10:
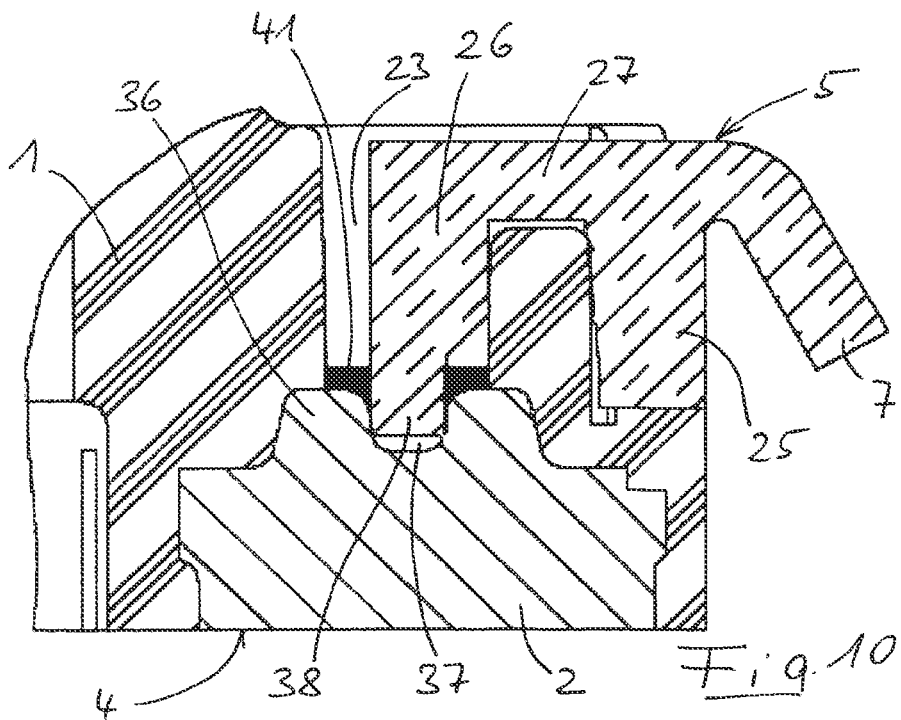
Figure 11:
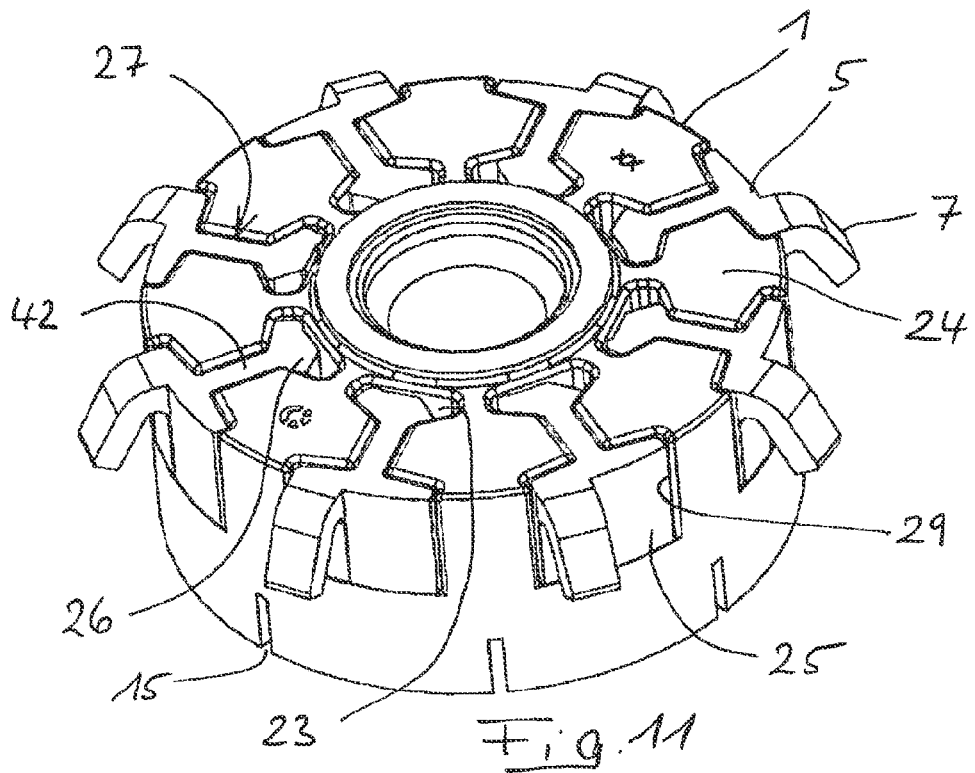
FIG. 11 shows a perspective view from above of another flat commutator produced by application of the present invention.
Figure 12:
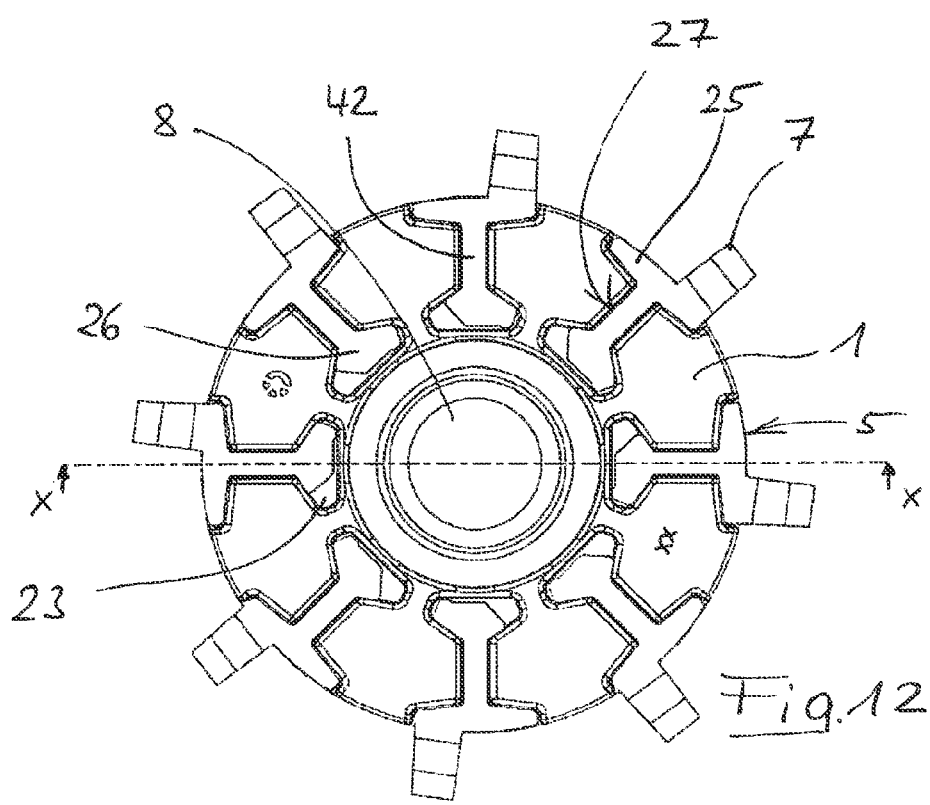
FIG. 12 shows a top view of the flat commutator according to FIG. 11.
Figure 15:
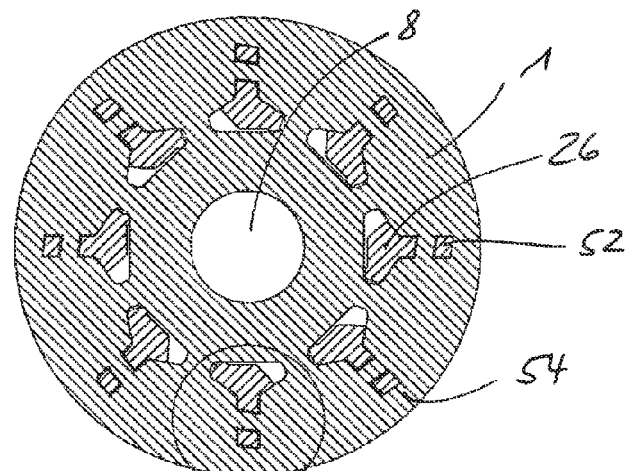
FIG. 15 shows a section, normal to the commutator axis, through the flat commutator according to FIGS. 11 to 13 along line Z-Z of FIG. 13.
Figure 15A:
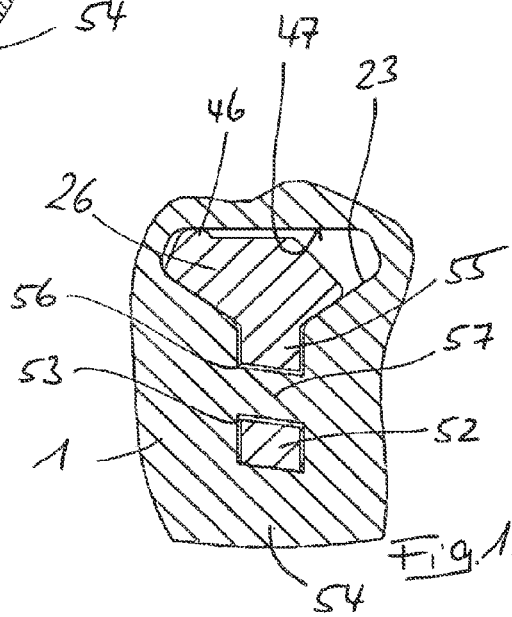
FIG. 15a shows a detail of FIG. 15 in an enlarged view.
Figure 16:
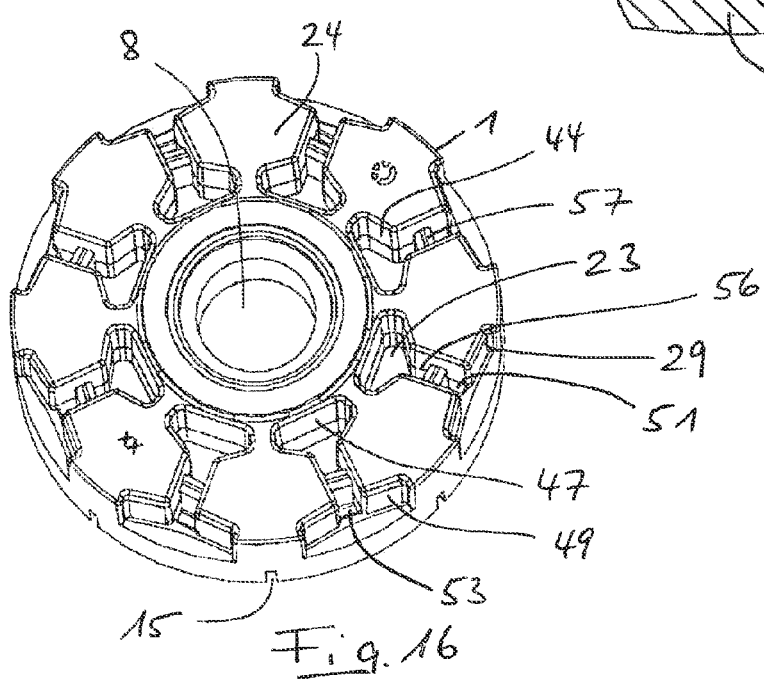
FIG. 16 shows a perspective view from above of the unit, comprising the support body and the carbon segments (after separation of the annular carbon disk into individual carbon segments), of the flat commutator according to FIGS. 11 to 15

FIG. 10 illustrates that, after conductor segments 5 have been mounted on support body 1, openings 23 are filled at least partly with a protective and/or sealing means 41, which shields contact zones 40 reliably from the medium in which the commutator in question will be operated. The sealing and protective effect is particularly pronounced when the contact pins, as illustrated in FIGS. 9 and 10, are tapered at their ends to contact tips 38. Nevertheless, this is not mandatory, so that at least partial filling of openings 23 with a protective and/or sealing means is advantageous even in the embodiment according to FIGS. 1 to 7.

Otherwise, the foregoing explanations for FIGS. 1 to 7 are equally enlightening for the embodiments according to FIGS. 8 to 10, and so to avoid repetitions they are merely pointed out here.

The exemplary embodiments illustrated in FIGS. 11 to 19 deviate in the aspects explained hereinafter from the embodiments described in the foregoing, but nevertheless are otherwise substantially identical thereto, so that to this extent—again to avoid repetitions—the foregoing explanations of exemplary embodiments according to FIGS. 1 to 10 are merely pointed out here.

A substantial deviation of the flat commutators according to FIGS. 11 to 17 on the one hand and 18 and 19 on the other hand compared with the embodiments described hereinabove exists in the fact that bridging parts 27 of conductor segments 5 respectively have the form here of a connecting web 42, which is narrower in circumferential direction than base 25 and contact pin 26. Or in other words: In this embodiment, not only base 25 but also contact pin 26 has a greater extent in circumferential direction than bridging part 27. Furthermore, the said contact pin does not have sharp-edged polygonal geometry that is received in an opening with round cross section, but instead has an irregular cross section with rounded edges. This cross section of contact pins 26 is adapted to the cross-sectional shape of openings 23 in such a way that on both sides of connecting web 42 the contact pin bears with bearing faces 43 on corresponding bracing faces 44 of associated opening 23 of support body 1. These two bracing faces 44 converge in the form of wedges in the direction of connecting web 42. As is obvious, contact pin 26 does not fill opening 23 completely; to the contrary, a free space 45 is present, through which, for example, the point of connection of contact pin 26 with the surface of the respective associated carbon segment 2 may be inspected. Also obvious is the raised ridge 46, which is disposed in radially inside position on contact pin 26, extends in axial direction and bears on opposite surface 47 of opening 23 receiving contact pin 26. In this embodiment, ridge 46 forms the only contact of contact pin 26 with surface 47, disposed in radially inside position, of opening 23.

Also on both sides of connecting web 42, base 25 bears with bearing faces 48 on corresponding bracing faces 49 of associated pocket 29 of support body 1. Bracing faces 49 of support body 1 and bearing faces 48 of base 25 of conductor segment 5 also converge in the form of wedges in the direction of connecting web 42, albeit with a greater wedge angle than in the region of contact pin 26.

Furthermore, a tongue 50 is molded in radially inside position onto base 25 of conductor segment 5. Beginning from connecting web 42, this extends over the entire axial length of base 25, engages in a corresponding groove 51 of support body 1 and projects in axial direction toward brush running surface 4 opposite base 25. In this case, corresponding axial extension 52 engages in an associated opening 53 of support body 1 in such a way that it is overlapped by the support body, especially in radially outward direction (see overlap 54).

In radially outside position, there is molded onto contact pin 26 a tongue 55, which, starting from connecting web 42, extends over the entire axial length of contact pin 26 and engages in a corresponding groove 56 formed in opening 26. In support body 1, between the two grooves 51 and 56, there is formed a web 57, which engages in a notch 58 formed between tongues 50 and 55 of conductor segment 5. The position of web 57, which is obviously inclined in the drawing but does not necessarily have to be, is functionally related here with the fact that terminal hook 7 is disposed off-centered on base 25 of conductor segment 5.

Figure 18:
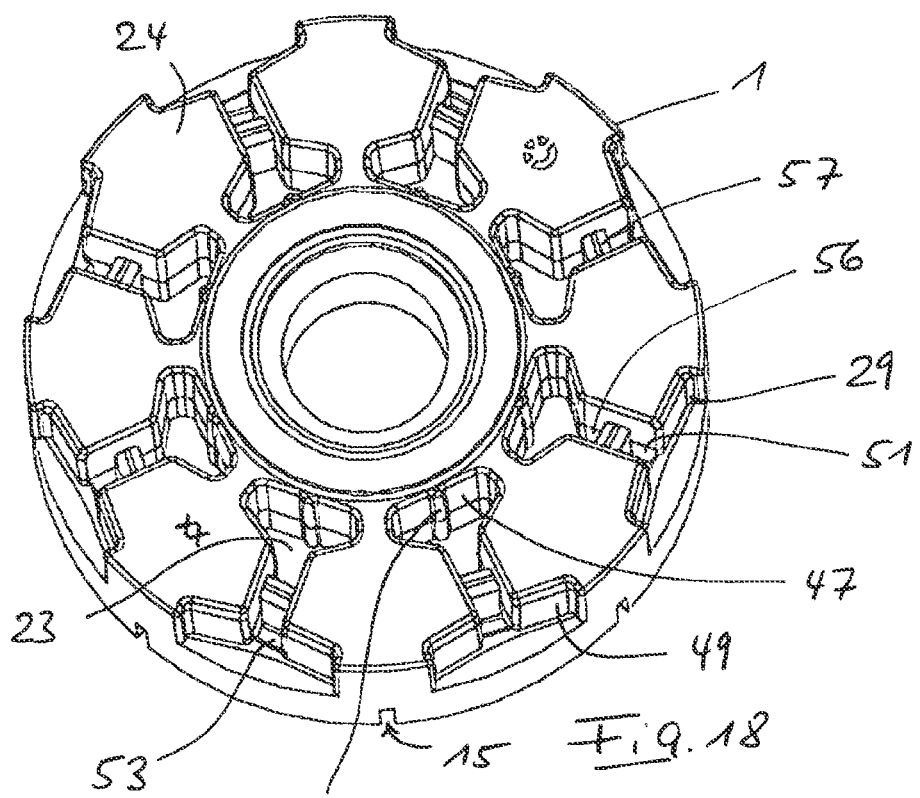
FIG. 18 shows the unit, comprising the support body and the carbon segments (after separation of the annular carbon disk into individual carbon segments), of an embodiment modified compared with the flat commutator according to FIGS. 11 to 17
Figure 19:
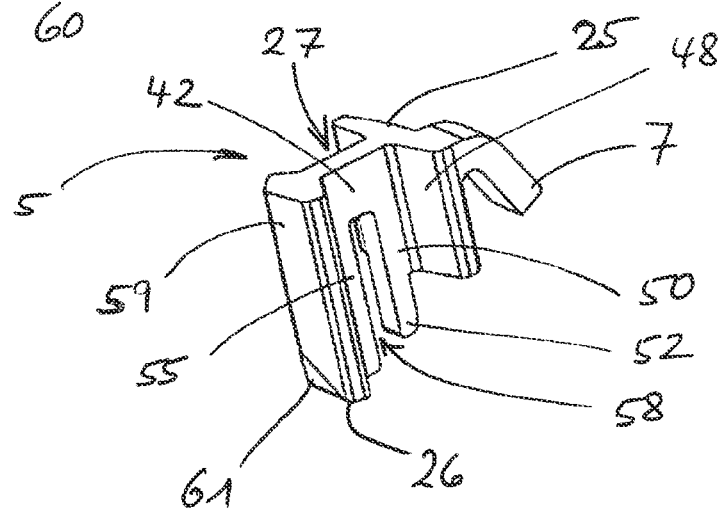
FIG. 19 shows the conductor segment of a flat commutator provided with the unit according to FIG. 18.

The only relevant modification of the exemplary embodiment according to FIGS. 18 and 19 compared with the embodiment explained in the foregoing according to FIGS. 11 to 17 consists in the fact that, in order to provide for a distance between radial inside face 59 of contact pin 26 and opposite surface 47 of opening 23 receiving contact pin 26, a ridge is not disposed in radially inside position on contact pin 26 here, but instead a raised ridge 60, extending in axial direction, is disposed on radially inside surface 47 of opening 23. As illustrated in FIG. 18, this may be provided substantially centrally (as viewed in circumferential direction) on radially inside surface 47 of opening 23; this is in no way mandatory, however, since an off-centered arrangement of the ridge in question also leads to similar advantages. Also further obvious in FIG. 19 is a chamfer 61 on one of the two lower corners of contact pin 26 (see also FIG. 17), which facilitates insertion thereof in opening 23 and in turn mounting of corresponding conductor 5. In an expedient modification, such chamfers 61 may also be provided in the region of both inner lower corners of contact pin 26. Such a chamfer 61 facilitating mounting of conductor segments 5 is also possible in the region of the outer lower corners of contact pin 26.

We claim:

1. A method for producing a flat commutator for a dynamo-electric machine, which commutator comprises an insulating support body (1), a plurality of carbon segments (2) and a plurality of conductor segments (5) connected electrically conductively therewith, wherein the carbon segments define a substantially plane brush running surface (4) and the conductor segments each have a rotor-winding terminal (6), the method comprising:

preparation of an annular carbon disk (14);

molding of the support body (1) onto the annular carbon disk by injection-molding plastic material thereon in such a way that the support body bears interlockingly and frictionally thereon in radially outward position and radially inward position as well as on the end face (13) of the annular carbon disk opposite the brush running surface;

creation, in the support body, of openings (23) that extend from a surface (24) of the support body opposite the brush running surface to a surface (19) of the carbon segments (2) or of the annular carbon disk (14) opposite the brush running surface;

mounting of the conductor segments (5) on the support body in such a way that a contact pin (26) of the conductor segments passes respectively through one of the openings and at its free end contacts the surface (19) of the annular carbon disk (14) opposite the brush running surface; and separation of the annular carbon disk (14) into carbon segments (2) insulated from one another.

2. The method of claim 1, wherein the separation of the annular carbon disk (14) into insulated carbon segments (2) already takes place before the conductor segments (5) are mounted on the support body (1).

3. The method of claim 1, wherein the creation of the openings (23) in the support body (1) takes place during molding of the support body.

4. The method of claim 1, wherein the intermediate product comprising the annular carbon disk (14) and the support body (1) molded thereon is subjected before mounting of the conductor segments (5) to technical aging, especially thermal aging.

5. The method of claim 1, wherein the intermediate product comprising the annular carbon disk (14), the support body and the conductor segments (5) are heat-treated, in order to ensure durable, stable electrical connections between the carbon and the conductor segments.

6. The method of claim 1, wherein a circumferential rim (10, 12) of the annular carbon disk (14) is profiled in steps, or is toothed.

7. The method of claim 1, wherein an electrically conductive adhesive, is introduced into the openings (23) before the conductor segments (5) are mounted on the support body (1).

8. The method of claim 1, wherein the openings (23) are filled, after the conductor segments (5) have been mounted on the support body (1), at least partly with a protective or sealing substance (41).

9. The method of claim 1, wherein the annular carbon disk (14) is profiled with an annular slot on its end face (13) opposite the brush running surface (4).

10. The method of claim 1, wherein the annular carbon disk (14) has socket-like projections on its end face (13) opposite the brush running surface, and wherein the contact pins (26) of the conductor segments each penetrate a corresponding socket-like projection.

11. A flat commutator comprising an insulating support body (1), a plurality of carbon segments (2) insulated from one another and a plurality of conductor segments (5) connected electrically conductively therewith, wherein the carbon segments define a substantially plane brush running surface (4), the conductor segments each have a corresponding rotor-winding terminal (6) and the support body bears interlockingly and frictionally thereon in radially outward and radially inward position as well as on the end face (13) of the carbon segments opposite the brush running surface and is provided with openings (23) that extend from a surface (24) of the support body opposite the brush running surface to a surface (19) of the carbon segments opposite the brush running surface, wherein furthermore a contact pin (26) of each of the conductor segments passes through a respective one of the openings and contacts the surface of the carbon segments opposite the brush running surface.

12. The flat commutator of claim 11, wherein the contact pins (26) respectively fill the cross sections of the associated openings (23) only partly.

13. The flat commutator of claim 11, wherein the contact pins (26) have a polygonal cross section and bear along edges (32) on the inner surface of the respective associated opening (23).

14. The flat commutator of claim 11, wherein the conductor segments (5) are each provided adjacent to the corresponding rotor-winding terminal (6) with a base (25) received in a pocket (29) of the support body (1), wherein the base (25) of the conductor segments (5) and the respective associated pocket (29) engage interlockingly in one another.

15. The flat commutator of claim 14, wherein the cross-sectional area of the base (25) is larger in a plane perpendicular to the commutator axis (3) than the cross-sectional area of the contact pin (26) of one of the conductor segments.

16. The flat commutator of claim 14, wherein the pockets (29) are provided with an incision (31) having a tangential portion disposed in radially inward position as well as two radial portions.

17. The flat commutator of claim 14, wherein the contact pin (26) of each of the conductor segments (5) is respectively joined with the base (25) thereof via a bridging part (27), wherein the bridging parts (27) run substantially in a plane perpendicular to the commutator axis (3).

18. The flat commutator of claim 17, wherein the bridging parts (27) are received in recesses (33), which extend on the end face (24) of the support body (1) opposite the brush running surface (4) respectively from a pocket (29) to an associated opening (23).

19. The flat commutator of claim 17, wherein the bridging parts (27) respectively have the form of a connecting web (42), which is narrower in circumferential direction than the base (25) and the contact pin (26) of one of the conductor segments, wherein on both sides of the connecting web the base and the contact pin bear with bearing faces (48; 43) on corresponding bracing faces (49; 44) of the associated pocket (29) and opening (23) of the support body (1).

20. The flat commutator of claim 19, wherein the corresponding bracing and bearing faces (49, 44; 48, 43) converge in pairs in the form of wedges in the direction of the connecting web (42).

21. The flat commutator of claim 14, wherein a tongue (50) projecting in the axial direction toward the brush running surface (4) opposite the base is molded in a radially inside position onto the base (25), wherein the corresponding axial extension (52) engages in an associated opening (53) of the support body (1) in such a way that it is overlapped in radially outward position by the support body.

22. The flat commutator of claim 14, wherein a tongue (55) that engages in a corresponding groove (56) of the support body (1) is molded in a radially outward position onto the contact pin (26) and extends substantially over the entire axial height of the contact pin.

23. The flat commutator of claim 14, wherein the rotor winding terminal (6) is disposed on the base (25) such that it is off-centered in circumferential direction.

24. The flat commutator of claim 11, wherein the contact pins of each of the conductor segments contact the surface (13) of a corresponding carbon segment opposite the brush running surface with their end faces (28).

25. The flat commutator of claim 11, wherein the contact pins (26) of each of the conductor segments are provided with tapered contact tips (38), which are disposed at their ends and penetrate into socket-like projections (26) disposed on the carbon segments (2) on the end faces (19) thereof opposite the brush running surface (4).

26. The flat commutator of claim 11, wherein the contact pin (26) of each of the conductor segments is provided in a radially inside position with a raised ridge (46), which extends substantially in axial direction and bears on the opposite surface (47) of the opening (23) receiving the contact pin.

27. The flat commutator of claim 11, wherein the surface (47) of the opening (23) receiving the contact pin (26) of each of the conductor segments is provided in a radially inside position with a raised ridge (60), which extends substantially in an axial direction and on which the contact pin bears with its opposite surface (59).

* * * * *